US005698005A

United States Patent [19]

Schapira et al.

[11] Patent Number: 5,698,005

[45] Date of Patent: Dec. 16, 1997

[54] COMPOSITION WHICH IS SIMULTANEOUSLY ANTICLUMPING AND WATER-REPELLANT FOR SALTS, SIMPLE AND COMPLEX FERTILIZERS AND PROCESS FOR THE USE THEREOF

[75] Inventors: Joseph Schapira, Paris; Jean-Claude Cheminaud, Herblay; Pascal Petitbon, Franconville; Dominique Imbert, Courbevoie, all of France

[73] Assignee: CFPI Industries, Gennevilliers, France

[21] Appl. No.: 533,146

[22] Filed: Sep. 25, 1995

[30] Foreign Application Priority Data

Sep. 26, 1994 [FR] France ........ 94 11459

[51] Int. Cl.$^6$ ........ C05G 5/00; C09K 3/00

[52] U.S. Cl. ........ 71/64.07; 252/384; 423/268; 423/274

[58] Field of Search ........ 252/384; 71/64.02, 71/64.07; 423/268, 274

[56] References Cited

U.S. PATENT DOCUMENTS

| | | | |
|---|---|---|---|
| 3,660,070 | 5/1972 | Maruta et al. | 423/268 |
| 4,356,020 | 10/1982 | Grünert et al. | 423/268 |
| 4,374,039 | 2/1983 | Schapira et al. | 252/384 |

FOREIGN PATENT DOCUMENTS

| | | | |
|---|---|---|---|
| 0 202 753 | 4/1986 | European Pat. Off. . | |
| 0 341 102 | 4/1989 | European Pat. Off. . | |
| 389331 | 9/1990 | European Pat. Off. | 252/384 |
| 0 574 306 | 6/1993 | European Pat. Off. . | |
| 2 221 175 | 3/1973 | France . | |
| 2214513 | 8/1974 | France | 252/384 |
| 22145158 | 8/1974 | France | 252/384 |
| 2 460 706 | 7/1979 | France . | |
| 2536300 | 5/1984 | France | 252/384 |
| 2629815 | 10/1989 | France . | |
| 1043405 | 9/1966 | United Kingdom | 423/268 |
| WO 93/16793 | 2/1993 | WIPO . | |

OTHER PUBLICATIONS

Derwent Publications Ltd., London, GB; AN 86-065685 & JP-A-61 017 486 (KAO Corp.), Jan. 25, 1986.

*Primary Examiner*—Wayne Langel
*Attorney, Agent, or Firm*—Larson & Taylor

[57] ABSTRACT

The invention relates to a composition, which is simultaneously anticlumping and water-repellent, for salts, simple and complex fertilizers. This composition contains:

on the one hand, an anticlumping product chosen from fatty amines, amine salts of phosphoric esters, amine salts of alkylarylsulphonic acids and mixtures thereof, and on the other hand, an anticlumping substance capable of imparting water-repellent properties and consisting of the product of the reaction of an alcohol or an amine with a carboxylic acid or anhydride bearing a hydrocarbon group having from 20 to 500 carbon atoms, as well as a formulation agent.

22 Claims, No Drawings

COMPOSITION WHICH IS SIMULTANEOUSLY ANTICLUMPING AND WATER-REPELLANT FOR SALTS, SIMPLE AND COMPLEX FERTILIZERS AND PROCESS FOR THE USE THEREOF

The invention relates to a composition, which is simultaneously anticlumping and water-repellent, for salts, simple and complex fertilizers.

It also relates to a process which makes it possible to impart anticlumping and water-repellent properties to salts, simple fertilizers and complex fertilizers, and which consists in using the abovesaid composition.

Lastly, the invention is directed towards the salts, simple and complex fertilizers whose constituent particles contain a coating which is based on the composition in accordance with the invention.

The abovesaid salts, simple and complex fertilizers are selected from the group comprising ammonium nitrate, potassium nitrate and calcium nitrate, mono- and diammonium phosphates, calcium phosphate, potassium chloride, potassium sulphate, urea and ammonium sulphate.

Those skilled in the art know that the storage of salts, of simple fertilizers and of complex fertilizers, which are usually in the form of granules, poses considerable problems in humid atmosphere, despite the anticlumping treatments applied before storage to the products in question.

Indeed, the said products often show evidence, under these conditions, of a tendency towards moisture uptake which is reflected essentially in a degranulation or in the formation of a harder or softer crust and in the formation, within the bulk of granules, of what is referred to in the art as "candles".

The aim of the invention is thus, especially, to overcome this drawback and to make available to the user means, that is to say a composition and a process, which make it possible not only to prevent the products in question from clumping but also to combat the moisture uptake by these products when they are stored in a humid atmosphere, in other words to endow them with water-repellent properties.

After intense research, the Applicant Company has found, to its credit, that this aim was achieved, in an entirely surprising and unexpected manner, when an anticlumping substance capable of imparting water-repellent properties is combined with certain anticlumping compositions that are themselves already known, this anticlumping substance consisting of the product of the reaction of an alcohol or an amine with a carboxylic acid or anhydride bearing a hydrocarbon group having from 20 to 500 carbon atoms.

It follows therefrom that the composition, which is simultaneously anticlumping and water-repellent, in accordance with the invention is characterized in that it contains:

- on the one hand, an anticlumping product chosen from fatty amines, amine salts of phosphoric esters, amine salts of alkylarylsulphonic acids and mixtures thereof, and
- on the other hand, an anticlumping substance capable of imparting water-repellent properties and consisting of the product of the reaction of an alcohol or an amine with a carboxylic acid or anhydride bearing a hydrocarbon group having from 20 to 500 carbon atoms.

According to an advantageous embodiment of the anticlumping and water-repellent composition in accordance with the invention, the anticlumping substance capable of imparting water-repellent properties to the composition is the result of the reaction of an alcohol, an amine or an alkanolamine with a carboxylic acid from the group comprising acrylic acid, fumaric acid, maleic acid and succinic acid or the anhydrides thereof, this acid or anhydride bearing a hydrocarbon group mainly consisting of alkyl or alkenyl groups, the isobutyl group being particularly preferred.

According to another advantageous embodiment of the anticlumping and water-repellent composition in accordance with the invention, the anticlumping substance capable of imparting water-repellent properties to the composition is the result of the reaction of an alcohol, an amine or an alkanolamine with a polyalkenyl-succinic acid or the anhydride thereof and, preferably, polyisobutenyl-succinic acid, also known as PIBSA and represented by the following formulae:

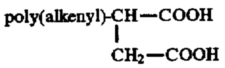

or

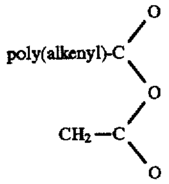

This anticlumping substance is described as being anticlumping in European Patent Application No. 0,202,753, which shows it as imparting, to materials in the form of particles having a tendency towards clumping, an anticlumping coating whose outer surface is, like that of the anticlumping coatings obtained by treatment with fatty amines or with alkyl-arylsulphonates, lipophilic, or in other words hydrophobic, in nature.

Now, it is well known to those skilled in the art that these anticlumping coatings with a lipophilic outer surface, that are conventionally obtained by treatment of the particles to be rendered anticlumping with fatty amines or with alkylarylsulphonates, do not endow these particles with a sufficient resistance to moisture uptake.

Those skilled in the art were thus in no way encouraged to search for such a property in the case of the family of anticlumping agents consisting of the products defined above, thereby emphasizing the unexpected and surprising nature of the result of the Applicant Company's research.

According to another advantageous embodiment of the anticlumping and water-repellent composition in accordance with the invention, the fatty amine is chosen from the group of amines represented by the formula $RNH_2$ in which R is a linear or branched alkyl or alkylene group having from 10 to 24 carbon atoms and, preferably, from the group consisting of the hydrogenated fatty amines having $C_{16}$ to $C_{22}$ alkyl chains.

According to another advantageous embodiment of the anticaking and water-repellent composition in accordance with the invention, the phosphoric acid ester is a compound which may be prepared by direct reaction of a compound carrying a hydroxyl group, such as an alcohol, an alkylphenol or an alkylnaphthol, with, for example, phosphoric anhydride, the said compound being represented by the general formulae:

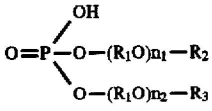

(I)

and

-continued

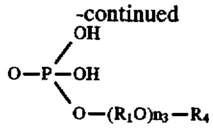

(II)

in which $R_1$ represents an alkylene group having from 2 to 4 carbon atoms, $R_2$, $R_3$ and $R_4$ each represent an alkyl group having from 8 to 20 carbon atoms or an alkylaryl group in which the alkyl part has from 8 to 12 carbon atoms, $n_1$, $n_2$ and $n_3$ represent a number from 0 to 15 and preferably from 0 to 5.

These compounds are generally in the form of mixtures of mono- and diester.

The best results are achieved when alkylphosphates whose alkyl part consists of 8 to 20 carbon atoms are used.

According to another advantageous embodiment of the anticlumping and water-repellent composition in accordance with the invention, the alkylarylsulphonic acid is chosen from the group comprising mono-, di- or trisulphonic acids of which the aromatic, preferably benzoic or naphthalenic, more particularly naphthalenic, part is mono- or polyalkyl-substituted, the degree of substitution being an average degree corresponding to the alkyl/aryl molar ratios used for the synthesis, it being understood that, for each of the degrees of substitution envisaged, namely, generally from 1 to 4, it is possible to have complex mixtures of sulphonic acid isomers, the total number of carbon atoms in the alkyl part preferably not exceeding 16 in the mixtures in question.

According to another advantageous embodiment of the anticlumping and water-repellent composition in accordance with the invention, it comprises a combination of amine salts of acid phosphate esters and of alkylaryl-sulphonic acids according to French Patent No. 2,629,815 filed on 7 Apr. 1988 by the Applicant, this combination being characterized in that it comprises one or more amine salts of alkylaryl-sulphonic acids and one or more amine salts of acid phosphate esters, optionally in the presence of an excess of amine.

According to another advantageous embodiment of the anticlumping and water-repellent composition in accordance with the invention, it comprises from 5 to 35%, preferably from 5 to 20% and, even more preferably, from 5 to 15% by weight of the anticlumping substance chosen from fatty amines, amine salts of phosphoric esters, amine salts of alkylarylsulphonic acids and mixtures thereof, and from 0.1 to 10%, preferably from 1 to 5%, by weight of the anti-clumping substance consisting of the product of the reaction of an alcohol or an amine with a carboxylic acid or anhydride bearing a hydrocarbon group having from 20 to 500 carbon atoms.

The compositions in accordance with the invention are advantageously formulated in oils and waxes.

The mineral oils are preferably chosen from those of paraffinic or naphthenic nature whose viscosity at 40° C. is between 15 and 800 $mm^2/s$ and preferably between 20 and 150 $mm^2/s$.

The waxes are preferably chosen from macrocrystalline waxes or mixtures of microcrystalline and macrocrystalline waxes.

Given that waxes are characterized by their melting point, the wax or the mixture of waxes used in the compositions in accordance with the invention has a melting point which may be between 45° and 100° C., preferably from 48° to 80° C.

According to another advantageous embodiment of the anticlumping and water-repellent composition in accordance with the invention, it contains from 55 to 95%, preferably from 75 to 95%, or alternatively, more preferably, from 80 to 92% by weight of formulation agents consisting of the oils and/or waxes identified above.

The process in accordance with the invention, which is capable of imparting anticlumping and water-repellent properties to salts, simple and complex fertilizers, is characterized in that an effective amount of the composition in accordance with the invention is applied to the said salts, simple and complex fertilizers, by spraying.

According to an advantageous embodiment of the process in accordance with the invention, the composition in accordance with the invention is applied, at a temperature at which it is liquid, in an amount of from 200 to 4000 g per tonne of salt, simple or complex fertilizer, preferably in an amount of from 300 to 2000 g per tonne of salt, simple or complex fertilizer and, even more preferably, in an amount of from 300 to 1500 g per tonne of salt, simple or complex fertilizer.

It should be noted that the composition and the process in accordance with the invention also make it possible to combat the formation of dusts.

The invention may be even better understood with the aid of the comparative and non-limiting examples which follow, in which compositions in accordance with the invention, which have given good results and which correspond to advantageous embodiments, are shown.

In order to assess the quality, both from the anticlumping point of view and from the water-repellent point of view, of the treatments applied to the fertilizers subjected to the trials, a clumping test is performed, on the one hand, and two moisture uptake tests are performed, on the other hand, as described below.

Clumping Test

The treated fertilizer is packaged in polyethylene bags at an amount of 10 kg per bag, and then stored under pressure for a variable period at controlled temperature. In the case of Example 1, the bags are kept at a temperature of 25° C. under a load such that they are subjected to a pressure of 0.8 $kg/cm^2$, which simulates storage of a pile of fertilizers about 12 meters in height.

After the test, the bags are opened and the clumping is evaluated by weighing the lumps and by measuring their hardness.

The clumping index, which corresponds to the product of the percentage of clumping multiplied by the average of the hardness values of the lumps, is determined.

The lower the value of the clumping index, denoted by IM, the better is the clumping performance.

In the absence of lumps, the fertilizer is qualified by the term of the art "free flowing".

Moisture Uptake Tests

Two types of moisture uptake test are carried out.

The first is a rapid test consisting in placing a layer of fertilizer granules in a crystallizing dish 6 cm in diameter, which is placed in a climatic chamber reproducing (in the case of Example 1) the following conditions:

Relative humidity: 75%

Temperature: 30° C.

The amount of water taken up after 24 hours is measured; the result is expressed as a weight percentage of water uptake.

The second test consists in placing 600 g of fertilizer into an 800 ml beaker and then in placing this beaker in a climatic chamber reproducing (in the case of Example 1) the following conditions:

Relative humidity: 75%

Temperature: 30° C.

The weight percentage of water absorbed after 72 hours is measured.

In addition, a qualitative observation is made of the appearance of the fertilizer after the test, in particular from the point of view of the physical appearance of the grain by evaluation of the degranulation.

EXAMPLE 1

The treated fertilizer is an ammonium nitrate assaying at 33.5% by weight of nitrogen.

Four compositions, A, B; C and D respectively, are prepared (B and D being compositions in accordance with the invention), the constitution of which is given in Table I:

TABLE I

| Nature of the constituents | Compositions (weight percentage of the constituents) A | B | C | D |
|---|---|---|---|---|
| Stearylamine | 10 | 10 | — | — |
| Oleylamine | — | — | 10 | 10 |
| Mineral oil of viscosity 20 mPa.s at 40° C. | 40 | 40 | 40 | 40 |
| Paraffin wax, melting point 50–52° C. | 50 | 47 | 50 | 47 |
| Amine salt of a PIBSA derivative | — | 3 | — | 3 |
| | 100 | 100 | 100 | 100 |

The temperature of the fertilizer is maintained at 35° C. and that of compositions A to D at 80° C., at which temperature they are liquid.

Each of the compositions A to D is sprayed at an amount of 20 g respectively onto a 20 kg sample of fertilizer (which corresponds to 1 kg per tonne of fertilizer), the spraying being carried out inside a concrete mixer.

The four samples of fertilizer thus treated are subjected to the clumping and moisture uptake tests described above.

The results obtained are collected in Table II.

TABLE II

| Composition | CLUMPING TEST % clumping | Hardness (average) in kg | IM | Crystallizing dish test % water uptake | Beaker test % water uptake | Observations |
|---|---|---|---|---|---|---|
| Untreated control | 100 | >15 | >1500 | 50 | 10 | considerable degranulation |
| A | 20 | 5 | 100 | 19 | 4 | moderate degranulation |
| B | 20 | 5 | 100 | 15 | 3 | slight degranulation |
| C | 50 | 7 | 350 | 16 | 3 | moderate degranulation |
| D | 30 | 7 | 12 | 12 | 2.5 | slight degranulation |

Examination of the results collected in Table II shows the improvement offered to the moisture uptake by the presence in accordance with the invention of a PIBSA derivative in an anticlumping composition based on fatty amines.

EXAMPLE 2

The influence of the presence of a PIBSA derivative in accordance with the invention was studied in an anticlumping composition based on amine salts of phosphoric esters.

The treated fertilizer is an ammonium nitrate assaying at 33.5% by weight of nitrogen and containing 0.65% by weight of aluminum sulphate (the aluminum sulphate is present as a process additive).

Four compositions, E, F, G and H respectively, are prepared, compositions F and H being in accordance with the invention.

The constitution of the compositions E to H is given in Table III.

TABLE III

| Nature of the constituents | Compositions (weight percentage of the constituents) E | F | G | H |
|---|---|---|---|---|
| Stearylamine ethylhexyl phosphate (50% monoester and 50% diester) | 10 | 10 | — | — |
| Stearlamine alkyl phosphate 50% monoester 50% diester mixture alkyl = $n.C_{16}C_{18}$ | — | — | 10 | 10 |
| Mineral oil of viscosity 20 mPa.s at 40° C. | 40 | 40 | 40 | 40 |
| Paraffin wax, melting point 50–52° C. | 50 | 47 | 50 | 47 |
| Amine salt of a PIBSA derivative | — | 3 | — | 3 |
| | 100 | 100 | 100 | 100 |

Four 20 kg samples of fertilizer are treated respectively with 20 g of each of the compositions E to H, as in Example 1 and under the same conditions.

The clumping test (duration: 7 days, pressure: 1 kg/cm$^2$, temperature: 25° C.) and the moisture uptake test (30° C., the relative humidity and the duration being 75% and 24 hours respectively for the crystallizing dish test, which is the only one carried out) are carried out.

The results are collected in Table IV.

TABLE IV

| Composition | CLUMPING TEST % clumping | Hardness (average) in kg | IM | Crystallizing dish test % water uptake |
|---|---|---|---|---|
| Untreated control | 100 | >18 | >1500 | 52 |
| E | 90 | 3 | 270 | 12 |
| F | 90 | 3 | 270 | 8.1 |
| G | 60 | 3.5 | 210 | 15 |
| H | 60 | 3.8 | 228 | 9.8 |

Examination of the results collected in Table IV shows the improvement offered to the moisture uptake by the presence in accordance with the invention of a PIBSA derivative in an anticlumping composition based on amine salts of phosphoric esters.

EXAMPLE III

The influence of the presence of a PIBSA derivative in accordance with the invention is studied in an anticlumping composition based on mixtures of amine salts of phosphoric esters and amine salts of alkaylarylsulphonic acids.

The treated fertilizer is an ammonium nitrate assaying at 33.5% by weight of nitrogen and containing 0.65% by weight of aluminum sulphate (the aluminum sulphate is present as a process additive).

Four compositions, I, J, K and L respectively, are prepared, compositions J and L being in accordance with the invention.

The constitution of compositions I to L is given in Table V.

TABLE V

| | Compositions (weight percentage of the constituents) | | | |
|---|---|---|---|---|
| Nature of the constituents | I | J | K | L |
| Stearylamine alkyl phosphate alkyl = $n.C_{12}C_{14}$ | — | — | 8 | 8 |
| Stearylamine alkyl phosphate 50% monoester 50% diester mixture alkyl = $n.C_{16}C_{18}$ | 8 | 8 | — | — |
| Stearylamine isopropyl naphthalene sulphonate | 2 | 2 | 2 | 2 |
| Mineral oil of viscosity 20 mPa.s at 40° C. | 40 | 40 | 40 | 40 |
| Macrocrystalline wax | 50 | 47 | 50 | 47 |
| Amine salt of a PIBSA derivative | — | 3 | — | 3 |
| | 100 | 100 | 100 | 100 |

Four 20 kg samples of fertilizer are treated respectively with 20 g of each of the compositions I to L, as in Example 1 and under the same conditions.

The clumping test (duration: 7 days, pressure: 1 kg/$cm^2$, temperature: 25° C.) and the moisture uptake test (30° C., at a relative humidity of 70% for 24 hours for the crystallizing dish test and 72 hours for the beaker test) are carried out.

The results are collected in Table VI.

TABLE VI

| | CLUMPING TEST | | | Crystallizing | Beaker | |
|---|---|---|---|---|---|---|
| Composition | % clumping | Hardness (average) en kg | IM | dish test % water uptake | test % water uptake | Observations |
| Untreated control | 100 | >15 | >100 | 55 | 10 | considerable degranulation |
| I | free flowing | — | — | 15 | 3 | slight surface degranulation |
| J | free flowing | — | — | 9.6 | 1.5 | surface not degraded |
| K | free flowing | — | — | 14 | 3 | slight surface degranulation |
| L | free flowing | — | — | 8,5 | 1.5 | surface not degraded |

Examination of the results collected in Table VI shows the improvement offered to the moisture uptake by the presence in accordance with the invention of a PIBSA derivative in an anticlumping composition based on mixtures of amine salts of phosphoric esters and amine salts of alkylarylsulphonic acids.

EXAMPLE 4

As in Example 3, the influence of the presence of a PIBSA derivative in accordance with the invention is studied in an anticlumping composition based on mixtures of amine salts of phosphoric esters and amine salts of alkylarylsulphonic acids.

The treated fertilizer is an NPK complex fertilizer of formula 15-11-22.

Two compositions, M and N respectively, are prepared (N being in accordance with the invention), the constitution of which is given in Table VII.

TABLE VII

| | Composition (weight percentage of the constituents) | |
|---|---|---|
| Nature of the constituents | M | N |
| Stearylamine alkyl phosphate 50% monoester 50% diester mixture alkyl = $n.C_{12}C_{14}$ | 8 | 8 |
| Stearylamine isopropyl naphthalene sulphonate | 2 | 2 |
| Vaseline of flowpoint 40° C. | 90 | 87 |
| Amine salt of a PIBSA derivative | — | 3 |

In the manner indicated in Example 1, four 20 kg samples of the abovesaid fertilizer are treated with 36 g (1.8 kg dose per tonne of fertilizer) of compositions M and N for the first two and with 24 g (1.2 kg dose per tonne of fertilizer) of compositions M and N for the next two.

The clumping and moisture uptake tests are performed.

The duration of the clumping test is 5 days at a pressure of 0.8 kg/$cm^2$ at 30° C.

The moisture uptake is performed at 30° C. at a relative humidity of 75% for 24 hours (crystallizing dish test).

The results are collected in Table VIII.

TABLE VIII

| Composition | Dosage kg/tonne | CLUMPING TEST % clumping | Hardness (average) in kg | IM | Crystallizing dish test % water uptake |
|---|---|---|---|---|---|
| Untreated control | — | 100 | >15 | >1500 | 30 |
| M | 1.8 | 20 | 3 | 60 | 15 |
| N | 1.8 | 20 | 3 | 60 | 7 |
| M | 1.2 | 40 | 5 | 200 | 14 |
| N | 1.2 | 40 | 5 | 200 | 7.5 |

Examination of the results collected in Table VIII shows the improvement offered to the moisture uptake by the presence in accordance with the invention of a PIBSA derivative in an anticlumping composition based on mixtures of amine salts of phosphoric esters and amine salts of alkylarylsulphonic acids.

However, from the point of view of the anticlumping effect, the dose of 1.2 kg/tonne is much poorer than the dose of 1.8 kg/tonne.

EXAMPLE 5

The influence of the dosage is studied, again using the compositions K and L of Example 3.

The treated fertilizer is a calcic ammonium nitrate (that is to say one containing calcium carbonate so as to bring the nitrogen content to 27%).

The process is performed as in Example 3, by treating eight 20 kg samples of fertilizer with doses of 1, then 0.8, then 0.6 and then 0.4 kg respectively of composition K per tonne of fertilizer for the first four, and then with doses of 1, then 0.8, then 0.6 and then 0.4 kg respectively of composition L per tonne of fertilizer.

The clumping test and the moisture uptake test in a crystallizing dish are carried out, as in Example 3.

The results recorded are collected in Table IX.

TABLE IX

| Composition | Dosage kg/tonne | CLUMPING TEST % clumping | Hardness (average) in kg | IM | Crystallizing dish test % water uptake |
|---|---|---|---|---|---|
| K | 1 | 23 | 2.5 | 57.5 | 14 |
| K | 0.8 | 25 | 2.5 | 62.5 | 12 |
| K | 0.6 | 30 | 3 | 90 | 14 |
| K | 0.4 | 75 | 6 | 450 | 18 |
| L | 1 | 25 | 2.6 | 65 | 8 |
| L | 0.8 | 23 | 2.5 | 57.5 | 6 |
| L | 0.6 | 30 | 3 | 93 | 8 |
| L | 0.4 | 80 | 6 | 480 | 13 |
| Untreated control | — | 100 | >15 | >1500 | 50 |

Examination of the results collecteded in Table IX shows that, for the treated fertilizer, the effective dose of composition K or L is between 0.6 and 1 kg/tonne of fertilizer.

We claim:

1. Simultaneously anti-clumping and water-repellent composition for salts, simple and complex fertilizers comprising an anticlumping product selected from the group consisting of fatty amines, amine salts of phosphoric esters, amine salts of alkylarylsulphonic acids and mixtures thereof, and an anticlumping substance capable of imparting water-repellent properties and consisting of the product of the reaction of an alcohol, an amine or an alkanolamine with a polyalkenyl-succinic acid or the anhydride thereof bearing a hydrocarbon group having from 20 to 500 carbon atoms and represented by the following formulae:

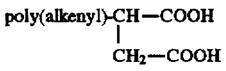

or

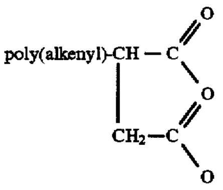

2. Composition according to claim 1, wherein the anticlumping substance capable of imparting water-repellent properties is the result of the reaction of an alcohol, an amine or an alkanolamine with a polyisobutenyl-succinic acid or the anhydride thereof bearing a hydrocarbon group having from 20 to 500 carbon atoms.

3. Composition according to claim 1, wherein the fatty amine is represented by the formula $RNH_2$ wherein R is a linear or branched alkyl or alkylene group having from 10 to 24 carbon atoms.

4. Composition according to claim 1, wherein the fatty amine is selected from the group consisting of the hydrogenated fatty amines having $C_{16}$ to $C_{22}$ alkyl chains.

5. Composition according to claim 1, wherein the phosphoric acid ester is a compound prepared by direct reaction of a compound carrying a hydroxyl group selected from the group consisting of an alcohol, an alkylphenol and an alkylnaphthol, with phosphoric anhydride, the said compound being represented by the general formulae:

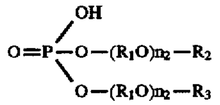

(I)

and

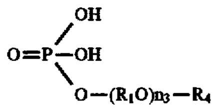

(II)

wherein $R_1$ represents an alkylene group having from 2 to 4 carbon atoms, $R_2$, $R_3$ and $R_4$ represent each an alkyl group having from 8 to 20 carbon atoms or an alkylaryl group in which the alkyl part has from 8 to 12 carbon atoms, $n_1$, $n_2$ and $n_3$ represent a number from 0 to 15.

6. Composition according to claim 1, wherein the phosphoric acid ester is a compound prepared by direct reaction of a compound carrying a hydroxyl group selected from the group consisting of an alcohol, an alkylphenol and an alkylnaphthol, with phosphoric anhydride, the said compound being represented by the general formulae:

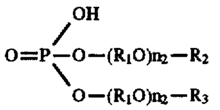

(I)

and

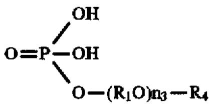

(II)

wherein $R_1$ represents an alkylene group having from 2 to 4 carbon atoms, $R_2$, $R_3$ and $R_4$ represent each an alkyl group having from 8 to 20 carbon atoms or an alkylaryl group in which the alkyl part has from 8 to 12 carbon atoms, $n_1$, $n_2$ and $n_3$ represent a number from 0 to 5.

7. Composition according to claim 1, wherein the alkylarylsulphonic acid is selected from the group consisting of mono-, di- or trisulphonic acids of which the aromatic part selected from the group consisting of benzoic and naphthalenic parts is mono- or polyalkyl-substituted, the degree of substitution being an average degree corresponding to the alkyl/aryl molar ratios used for the synthesis, wherein, for each of the degrees of substitution from 1 to 4, complex mixtures of sulphonic acid isomers occur wherein the total number of carbon atoms in the alkyl part does not exceed 16.

8. Composition according to claim 1 comprising a combination of at least one amine salt of alkylarylsulphonic acid and at least one amine salt of acid phosphate esters.

9. Composition according to claim 1 comprising a combination of at least one amine salt of alkylarylsulphonic acid and at least one amine salt of acid phosphate esters in the presence of an excess of amine.

10. Composition according to claims 1 comprising from 5 to 35% by weight of the anticlumping substance selected from the group consisting of fatty amines, amine salts of phosphoric esters, imine salts of alkylarylsulphonic acids and mixtures thereof, and from 0.1 to 10% by weight of the anticlumping substance consisting of the product of the reaction of an alcohol, an amine or an alkanolamine with a polyalkenyl-succinic acid or the anhydride thereof bearing a hydrocarbon group having from 20 to 500 carbon atoms.

11. Composition according to claims 1 comprising from 5 to 20% by weight of the anticlumping substance selected from the group consisting of fatty amines, amine salts of phosphoric esters, amine salts of alkylarylsulphonic acids and mixtures thereof, and from 0.1 to 10% by weight of the anticlumping substance consisting of the product of the reaction of an alcohol, an amine or an alkanolamine with a polyalkenyl-succinic acid or the anhydride thereof bearing a hydrocarbon group having from 20 to 500 carbon atoms.

12. Composition according to claims 1 comprising from 5 to 20% by weight of the anticlumping substance selected from the group consisting of fatty amines, amine salts of phosphoric esters, amine salts of alkylarylsulphonic acids and mixtures thereof, and from 1 to 5% by weight of the anticlumping substance consisting of the product of the reaction of an alcohol, an amine or an alkanolamine with a polyalkenyl-succinic acid or the anhydride thereof bearing a hydrocarbon group having from 20 to 500 carbon atoms.

13. Composition according to claims 1 comprising from 5 to 15% by weight of the anticlumping substance selected from the group consisting of fatty amines, amine salts of phosphoric esters, amine salts of aikylarylsulphonic acids and mixtures thereof, and from 0.1 to 10% by weight of the anticlumping substance consisting of the product of the reaction of an alcohol, an amine or an alkanolamine with a polyalkenyl-succinic acid or the anhydride thereof bearing a hydrocarbon group having from 20 to 500 carbon atoms.

14. Composition according to claims 1 comprising from 5 to 15% by weight of the anticlumping substance selected from the group consisting of fatty amines, amine salts of phosphoric esters, amine salts of alkylarylsulphonic acids and mixtures thereof, and from 1 to 5% by weight of the anticlumping substance consisting of the product of the reaction of an alcohol, an amine or an alkanolamine with a polyalkenyl-succinic acid or the anhydride thereof bearing a hydrocarbon group having from 20 to 500 carbon atoms.

15. Composition according to claim 1 comprising from 55 to 95% by weight of formulation agents consisting of oils and/or waxes.

16. Composition according to claim 1 comprising from 75 to 95% by weight of formulation agents consisting of oils and/or waxes.

17. Composition according to claim 1 comprising from 80 to 92% by weight of formulation agents consisting of oils and/or waxes.

18. Process for imparting anticlumping and water-repellent properties to salts and to simple and complex fertilizers, comprising applying by spraying on the said salts, simple and complex fertilizers, an effective amount of the composition according to claim 1.

19. Process according to claim 18, wherein the composition according to claim 1 is applied, at a temperature at which it is liquid, in an amount of from 200 to 4000 g per tonne of salt, simple or complex fertilizer.

20. Process according to claim 18, wherein the composition according to claim 1 is applied, at a temperature at which it is liquid, in an amount of from 300 to 2000 g per tonne of salt, simple or complex fertilizer.

21. Process according to claims 18, wherein the composition according to claim 1 is applied, at a temperature at which it is liquid, in an amount of from 300 to 1500 g per tonne of salt, simple or complex fertilizer.

22. Salts, simple and complex fertilizers whose constituent particles comprise a coating based on the composition according to claim 1.

* * * * *